Sept. 13, 1932.  H. W. JOHNSON ET AL  1,876,683

FASTENER

Filed Oct. 7, 1930

Hiram W. Johnson and
Lewis W. Johnson  Inventors

By C. A. Snow & Co.
Attorneys.

Patented Sept. 13, 1932

1,876,683

UNITED STATES PATENT OFFICE

HIRAM W. JOHNSON AND LEWIS W. JOHNSON, OF MIAMI, FLORIDA

FASTENER

Application filed October 7, 1930. Serial No. 487,081.

This invention relates to a fastener designed primarily for securing together the abutting faces of wooden members and it is more especially an improvement upon the well known "wiggle" nail or fastener.

It is an object of the invention to provide a fastener made up of separate penetrating elements connected at one end by integral webs so that should fasteners be driven into a structure from opposite sides, there would be no danger of cutting a chunk of the material from the work.

It is also an object of the invention to provide a fastener having all of the advantages of a nail or staple as well as the advantages of the ordinary corrugated or sinuous fasteners.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawing, the preferred forms of the invention have been shown.

Figure 1:
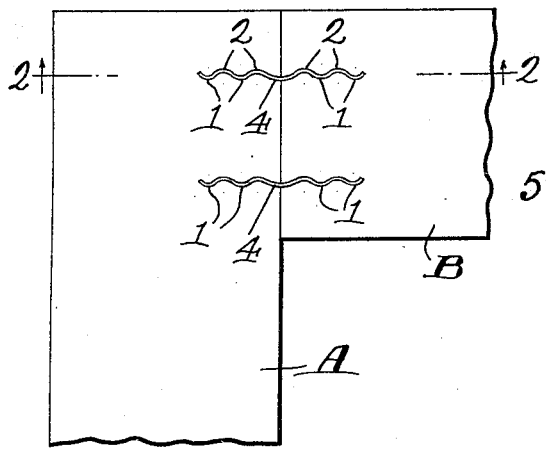
Figure 1 is a plan view of a portion of a structure showing two parts thereof joined by fasteners such as constitute the present invention.
Figure 4:
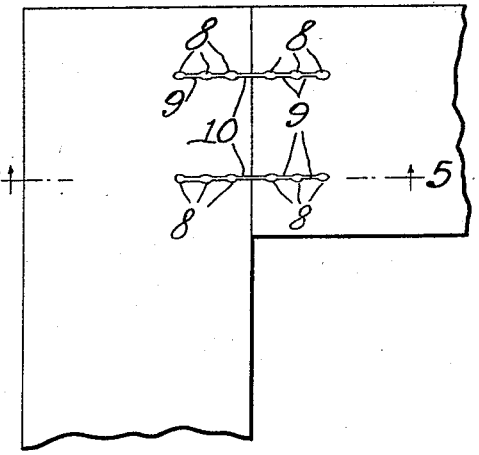
Figure 4 is a view similar to Figure 1, showing a modified form of fastener.
Figure 2:
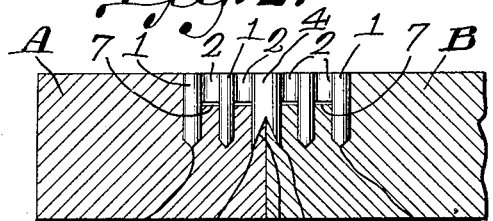
Figure 2 is a section on line 2—2, Figure 1.
Figure 5:
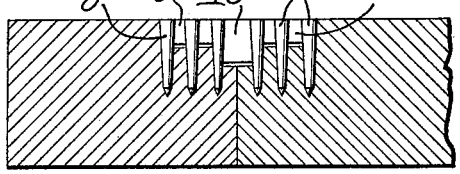
Figure 5 is a section on line 5—5, Figure 4.

Referring to the figures by characters of reference, 1 designates longitudinally channelled penetrating elements which are joined at one end by integral webs 2 which are also channelled but are curved oppositely to the penetrating elements so that the portion of the fastener made up of the webs and the adjoining ends of the penetrating element will be waved or corrugated from end to end. All of the penetrating elements are provided with points 3 but the intermediate or middle penetrating element is preferably wider than the remaining ones as shown at 4 so that its free end can be forked as at 5 to provide a staple-like structure having spaced points 6. Those edges of the webs 2 nearest the points 3 and 6 are sharpened as shown at 7 so as to present cutting edges to the work into which they are driven.

In practice the parts A and B of the work to be assembled are placed together in proper relation to each other after which the fasteners are arranged across the abutting faces with the intermediate or staple-like member 4 straddling the joint. The fasteners are then driven into the work and the several members 1 and 4 will be forced thereinto in the same manner as nails or staples and will be followed by the webs 2 which will cut into the work and act as a tie for preventing separation of the parts A and B.

After the exposed edge of the fastener has been brought to position where it is flush with the surface of the work, the penetrating members 1 and 4 will be extended beyond the webs into the work. Thus without requiring the use of webs of considerable width, the fastener will have all of the advantages of one in which the web is extended throughout the length of the penetrating portion. The fastener will have the further advantage of preventing the severance of a chunk of material from the work should fasteners be driven into the work from opposite sides and directly opposite each other. If the webs only penetrate a relatively short distance they will not tend to split the work. Nevertheless their efficiency as a tying means will not be impaired and the penetrating portions 1 and 4 will act to hold the webs just as firmly in the work as though they were of greater size.

Figure 6:
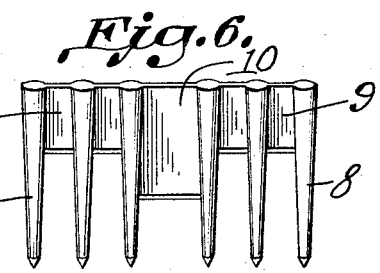
Figure 6 is a perspective view of one of the fasteners shown in Figure 4.

Instead of forming the fasteners of sheet material, which is corrugated or waved as heretofore described, they can be stamped or rolled into the form shown in Figure 6 wherein spaced nail-like penetrating elements 8 are used, these being connected by the thin chisel-like webs 9. If desired the two penetrating devices nearest the center of the fastener can be spaced apart a greater distance than the others and connected by a longer cutting web 10 so that a staple-like structure will thus be provided for straddling a joint. These elements 8 project beyond the opposed faces of the webs and provide oppositely disposed channels along each web as shown in Figure 6.

Figure 3:
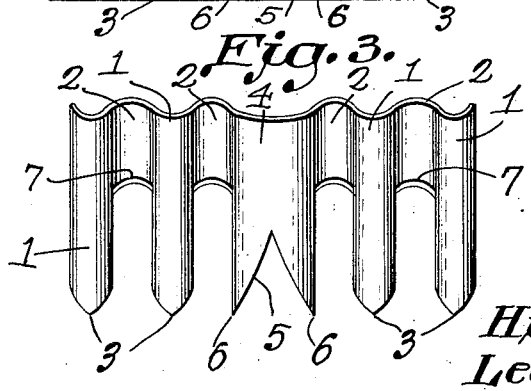
Figure 3 is a perspective view of one of the fasteners.

The same advantages are present in this modified form as in that shown in Figure 3 and it will be found that the fastener will act as an efficient means for holding together separate pieces of a structure, at the same time reducing to the minimum all danger of splitting or otherwise mutilating the work.

In both forms of the device illustrated there are provided staple members which act to straddle the joint between the parts to be connected and as these staple members do not have their side portions sharpened they will tend to draw together the edges of the joint without cutting laterally through them.

What is claimed is:

A fastener of the class described including spaced, substantially round, nail-like penetrating devices, and flat, alined chisel-like webs integral with and connecting said devices at one end, each of said devices being extended beyond opposite faces of the adjacent webs, each web and the adjoining devices cooperating to provide opposed channels between said devices and along opposite flat faces of the web.

In testimony that we claim the foregoing as our own, we have hereto affixed our signatures.

HIRAM W. JOHNSON.
LEWIS W. JOHNSON.